Dec. 28, 1926.

G. A. McFARLAND 1,612,592

THERMOMETER FRAME

Filed March 14, 1925

Fig.1.

Fig.2.

INVENTOR:-
GEORGE A. McFARLAND
BY
ATTORNEY.

Patented Dec. 28, 1926.

1,612,592

UNITED STATES PATENT OFFICE.

GEORGE A. McFARLAND, OF ST. LOUIS, MISSOURI, ASSIGNOR TO AMERICAN THERMOMETER COMPANY, OF ST. LOUIS, MISSOURI, A CORPORATION OF MISSOURI.

THERMOMETER FRAME.

Application filed March 14, 1925. Serial No. 15,573.

This invention relates to hot water thermometers, and has for its general object to provide a novel construction of thermometer frame which will be characterized by strength and simplicity in structure, and which may be economically manufactured.

Stated more in detail, objects of the invention are to provide a thermometer frame in the general form of an oblong dish-shaped structure presenting a depressed scale-plate surrounded by a substantially continuous flange having its outer edge curved rearwardly to present an ornamental appearance and to strengthen the structure; and to provide a thermometer frame pressed from a single sheet of metal, presenting a depressed scale-plate substantially surrounded by a flange and having a portion of the bottom of the structure constituting the scale-plate and a portion of the flange at the bottom of the structure projected downwardly and curved upon itself to form a tubular member for insertion and securement in a hollow exteriorly screw-threaded member containing mercury, and in which the lower end of the mercury tube of the thermometer is submerged, this member or bulb being for the purpose of permitting the thermometer to be screwed into a suitable screw-threaded aperture in the radiator, boiler, or the like, the temperature of the water in which it is desired to have indicated by the thermometer.

The invention is illustrated in the accompanying drawing, in which—

Figure 1 is a view in front elevation of a thermometer constructed according to my invention; and Figure 2 is a vertical sectional view of the same taken on the line 2—2 of Figure 1.

Referring now to the drawing, the numeral 1 indicates, generally, the main frame of the thermometer, which is substantially oblong in shape, its opposite ends, however, being rounded or curved, as indicated at 2, 3, respectively, for ornamental effect. The frame 1 is pressed from a single sheet of metal and comprises a flat bottom 4 having a continuous outwardly extending wall 5 which latter, at its outer edge, is curved rearwardly as indicated at 6, to form a strengthening flange and which, at the same time, imparts a finished and ornamental appearance to the structure. The frame, as a whole, presents the appearance of a small shallow dish and, in practice, is covered with white enamel. At the lower end 3 of the frame, the base portion 4 at the center is extended downwardly and the material of the flange 6 is cut inwardly, as indicated at 7 (Figure 2), the cuts being made at points equally distant from the central longitudinal line of the base 4, after which the projecting material of the base and flange is curved upon itself to form a tube 8.

The base or bottom 4 is provided with a thermometer scale 9, and thus constitutes the scale-plate of the thermometer. Secured on this scale-plate at its upper end, in any suitable manner as by the usual clip 10, is a mercury tube 11, which projects through and beyond th tube 8. The numeral 12 indicates a hollow cylindrical member closed at its lower end and constituting, in effect, a bulb. This bulb is supplied with mercury, indicated by the numeral 13, and is provided with exterior screw-threads 14, with a non-circular portion 15 to which a wrench may be applied to screw the bulb into the screw-threaded aperture of the container of the hot water, and with a set screw 16. The mercury 13 within the member 12 constitutes a bath for the lower end of the tube 11, said mercury 13 being entirely separate from the mercury within the tube, and the mercury 13 does not enter said tube 11. The interior of the bulb 12 is provided with a circular shoulder 17 which is adapted to form a seat for a washer, or washers, 18 mounted on the lower end of the mercury tube 11.

In assembling the parts of the thermometer, the tubular member 8 is inserted in the bore of the bulb 12 after the washers have been moved upward thereon to engage the bottom of said tubular portion. As a result, the washer or washers 18 will be firmly pressed between the lower end of said tubular portion and said shoulder. The set screw 16 will then be turned up to firmly secure the tubular portion 8 in the bulb 12.

A thermometer constructed as described may be economically manufactured; it is strong and durable in construction; presents an ornamental appearance, and by the provision of the depressed scale-plate, affords a protection for the mercury tube 11.

I claim:

1. A thermometer frame formed of a single sheet of metal and substantially oblong in shape, said frame comprising a depressed scale-plate and a substantially continuous integral wall projecting outward from the sides and ends of the same and having its outer edge curved rearwardly to provide a strengthening flange, and a retaining member in the form of a split tube formed integral with said thermometer frame and projecting from one end thereof.

2. A thermometer frame formed as an integral structure from a single sheet of metal and comprising a depressed scale-plate substantially surrounded by a continuous wall projecting outward from the sides and ends of the same and having its outer edge curved rearwardly to provide a strengthening flange, the flange being cut away at the lower end of the structure and the material thereof and of the scale-plate being projected downwardly and curved to form a tubular retaining member.

3. A thermometer frame formed as an integral structure from a single sheet of metal and comprising a depressed scale-plate of general oblong shape substantially surrounded by a continuous wall projecting outward from the sides and ends of the same and having its outer edge curved rearwardly to provide a strengthening flange, and a retaining member in the form of a split tube formed integral with said thermometer frame and projecting from one end thereof, a portion of said retaining member being free from the thermometer frame to permit shaping thereof.

4. A thermometer frame of general oblong shape formed as an integral structure from a single sheet of metal and having a depressed scale-plate substantially surrounded by a continuous wall and a retaining member in the form of a split tube formed integral with the thermometer frame at one end thereof.

In testimony whereof, I have hereunto set my hand.

GEORGE A. McFARLAND.